United States Patent
Kaneko

(10) Patent No.: US 7,465,898 B2
(45) Date of Patent: Dec. 16, 2008

(54) WIRE ELECTRIC DISCHARGE MACHINING METHOD OF MACHINING WORKPIECE WITH DIFFERENT THICKNESS

(75) Inventor: Mikio Kaneko, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 63 days.

(21) Appl. No.: 11/605,424

(22) Filed: Nov. 29, 2006

(65) Prior Publication Data

US 2007/0119821 A1 May 31, 2007

(30) Foreign Application Priority Data

Nov. 29, 2005 (JP) ............... 2005-343126

(51) Int. Cl.
*B23H 7/02* (2006.01)
*B23H 7/20* (2006.01)

(52) U.S. Cl. .................................. 219/69.12

(58) Field of Classification Search ............. 219/69.12, 219/69.16, 69.17; 700/162
See application file for complete search history.

(56) References Cited

U.S. PATENT DOCUMENTS

| 4,559,434 A | * | 12/1985 | Kinoshita | ................ 219/69.17 |
| 5,041,984 A | * | 8/1991 | Watanabe | .................... 700/162 |
| 5,243,166 A | * | 9/1993 | Nakayama | ................ 219/69.12 |

FOREIGN PATENT DOCUMENTS

| JP | A 53-106994 | | 9/1978 |
| JP | A 58-051020 | | 3/1983 |
| JP | 1-216725 A | * | 8/1989 |
| JP | 2-53526 A | * | 2/1990 |
| JP | 7-32217 A | * | 2/1995 |
| JP | B2 63-025889 | | 5/1998 |
| JP | A 2003-136339 | | 5/2003 |

* cited by examiner

*Primary Examiner*—Geoffrey S Evans
(74) *Attorney, Agent, or Firm*—McDermott Will & Emery LLP

(57) ABSTRACT

A wire electric discharge machining method of machining the workpiece with different thickness into a required shape with first cut and second cut. The method includes the steps of (a) detecting a position of the wire electrode relative to the workpiece, (b) detecting change in thickness of the workpiece during first cut, (c) storing the position of wire electrode as a thickness change position (Q1) when change in thickness of the workpiece from a first thickness (t1) to a second thickness (t2) is detected, (d) forming a zone (α) around the thickness change position, (e) comparing the position of wire electrode to the zone during second cut, and (f) changing at least one machining condition during times when it is determined that the wire electrode is positioned in the zone.

4 Claims, 6 Drawing Sheets

| serial number | position Q1 | | thickness t1 (μm) | thickness t2 (μm) |
|---|---|---|---|---|
| | x1 | y1 | | |
| 001 | 099999 | 000000 | 20000 | 25000 |
| 002 | 100000 | 000000 | 25000 | 30000 |
| 003 | 100001 | 000000 | 30000 | 35000 |
| 004 | 100002 | 000000 | 35000 | 40000 |

FIG.7 wire electrode material: brass (65% copper, 35% zinc)
workpiece material: steel SKD-11 (Japanese Industrial Standard)

servo reference voltage SV (V)

| machining step/thickness (mm) | | 005 | 010 | 020 | 030 | 040 | 050 | 060 | 070 | 080 |
|---|---|---|---|---|---|---|---|---|---|---|
| | 1st | – | – | – | – | – | – | – | – | – |
| second cut | 2nd | 47 | 45 | 43 | 41 | 39 | 37 | 35 | 33 | 31 |
| | 3rd | 24 | 23 | 22 | 21 | 20 | 19 | 18 | 17 | 16 |
| | 4th | 5 | 4 | 4 | 3 | 3 | 2 | 2 | 1 | 1 |
| | 5th | 12 | 12 | 12 | 12 | 12 | 12 | 12 | 12 | 12 | feed rate SS (mm/min)

| machining step/thickness (mm) | | 005 | 010 | 020 | 030 | 040 | 050 | 060 | 070 | 080 |
|---|---|---|---|---|---|---|---|---|---|---|
| | 1st | – | – | – | – | – | – | – | – | – |
| second cut | 2nd | 6.8 | 6.8 | 6.8 | 6.8 | 6.8 | 6.8 | 6.8 | 6.8 | 6.8 |
| | 3rd | 2.8 | 2.8 | 2.8 | 2.8 | 2.8 | 2.8 | 2.8 | 2.8 | 2.8 |
| | 4th | 4.8 | 4.8 | 4.8 | 4.8 | 4.8 | 4.8 | 4.8 | 4.8 | 4.8 |
| | 5th | 27 | 24 | 12 | 8 | 6 | 5 | 4 | 3.5 | 3 |

WIRE ELECTRIC DISCHARGE MACHINING METHOD OF MACHINING WORKPIECE WITH DIFFERENT THICKNESS

BACKGROUND OF THE INVENTION

1. Field of the Invention

The present invention relates to a wire electric discharge machining method of machining the electrically conductive workpiece by electric discharge. More particularly, the present invention relates to a wire electric discharge machining method of machining the workpiece with different thickness into a required shape with first cut and second cut.

2. Description of the Related Art

The wire electric discharge machining method is capable of removing material from the workpiece by repeatedly generating electric discharge across a work gap formed between the workpiece and a running wire electrode. The work gap is immersed in dielectric fluid such as deionized water. The electric discharge is generated by application of a series of controlled power pulses to the work gap. As illustrated in FIG. 1, the wire electrode E is vertically aligned between a pair of wire guides WG and moved relative to the workpiece W within a horizontal XY plane. During machining, a voltage across the work gap ("gap voltage") is fed back to an NC device for CNC wire electric discharge machine. The NC device controls feed rate of wire electrode so that the mean gap voltage is maintained at a servo reference voltage. As a mean gap voltage is considered to be proportional to the size or distance of the work gap, the servo reference voltage is set in accordance with an optimum size of the work gap. A power pulse of larger electrical energy increases material removal rate while it decreases roughness of machined surface and shape accuracy. In general, in order to balance material removal rate, surface roughness and shape accuracy, wire electric discharge machining is divided into a number of machining steps. In preparation for machining, a wire path and a set of machining conditions are determined for each machining step. Firstly, the wire electrode is moved on a first wire path, and the workpiece is cut to a rough required shape with a large electrical energy at high speed. Such rough machining is called first cut. At the time first cut is completed, surplus material that must be removed remains on the cut surface, and the cut surface does not have the required roughness. Next, the cut surface is finished at a required shape accuracy using a small electrical energy. Such finishing includes several machining steps and is collectively called second cut or skim cut. During second cut, the wire electrode is made to move on wire paths so that the size of the work gap becomes smaller. In this manner, the surplus material is gradually removed to obtain the required shape accuracy, and the roughness of the cut surface is gradually reduced to a required value. Normally, a smaller electrical energy is supplied to a work gap of smaller size for each subsequent machining step.

FIG. 1 illustrates the workpiece W with different thickness being machined in first cut. Change in thickness of the workpiece W causes change in machining area which in turn results in undesirable change in size of the work gap. Japanese publication of examined application No. 63-025889 discloses a method in which change in thickness of the workpiece is detected based on a feedback of a mean gap voltage or feed rate and machining conditions are changed in accordance with the detected thickness of the workpiece. However, as removal material in second cut is much smaller than that in first cut, it is difficult to accurately detect change in thickness of the workpiece based on a feedback of a mean gap voltage or feed rate. In second cut, for example, if a wire electrode E reaches a position Q2 on a second wire path P2 and thickness of the workpiece W is decreased from t1 to t2, the size of the work gap is undesirably increased, as illustrated in FIG. 2.

SUMMARY OF THE INVENTION

An object of the present invention is to provide a wire electric discharge machining method which is capable of determining a position at which at least one machining conditions should be changed in accordance with change in thickness of the workpiece in second cut.

The present invention is a wire electric discharge machining method of machining the workpiece into a required shape with first cut and second cut. For each cut, the setting of machining conditions and wire path on which a wire electrode is moved relative to the workpiece are different for each cut. The method includes the steps of (a) detecting a position of the wire electrode relative to the workpiece, (b) detecting change in thickness of the workpiece during first cut, (c) storing the position of wire electrode as a thickness change position (Q1) when change in thickness of the workpiece from a first thickness (t1) to a second thickness (t2) is detected, (d) forming a zone ($\alpha$) around the thickness change position, (e) comparing the position of wire electrode to the zone during second cut, and (f) changing at least one machining condition during times when it is determined that the wire electrode is positioned in the zone.

Preferably, a side length of the zone is based on a difference between a first offset (OF1) for first cut and a second offset (OF2) for second cut.

Preferably, the method includes a step of forming an additional zone ($\beta$) around a crossing position (Q0) at which the wire electrode reaches the zone. The step (f) includes changing at least one machining condition when it is determined that the wire electrode is positioned outside the additional zone.

It is preferable that the method further includes a step of storing the first and second thicknesses related to the thickness change position.

BRIEF DESCRIPTION OF THE DRAWINGS

FIG. 7 is an exemplary table showing relationship between the thickness and machining conditions.

DETAILED DESCRIPTION OF THE INVENTION

Figure 1:
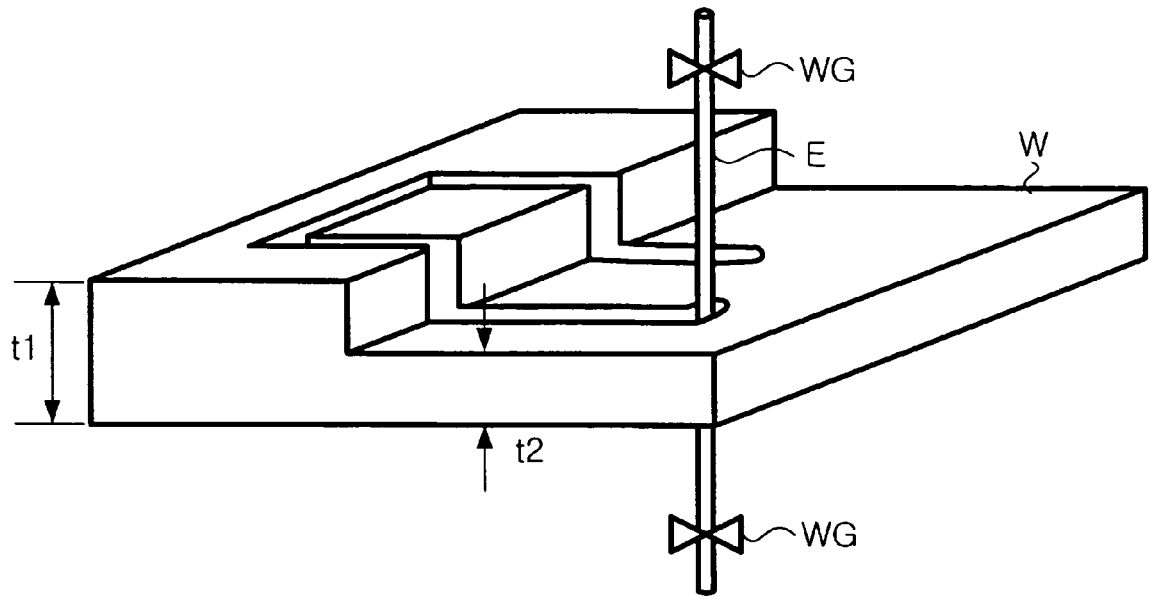
FIG. 1 is a perspective view illustrating the workpiece being machined in first cut.
Figure 2A:
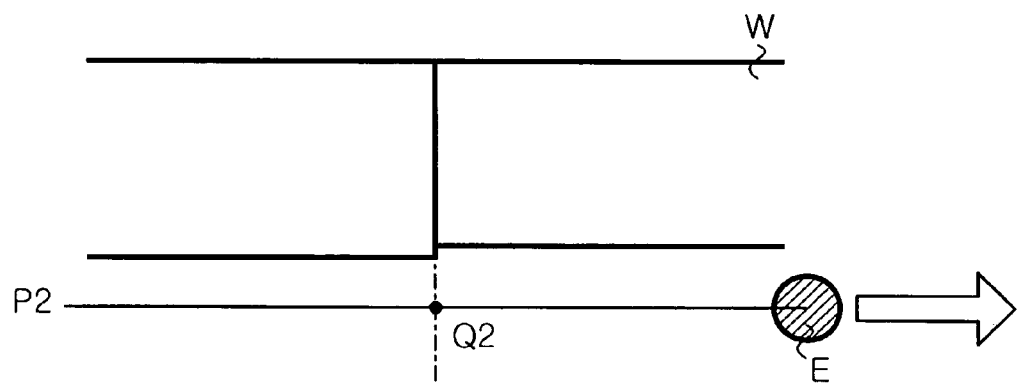
FIG. 2A is a plain view illustrating the workpiece being machined in second cut.
Figure 2B:
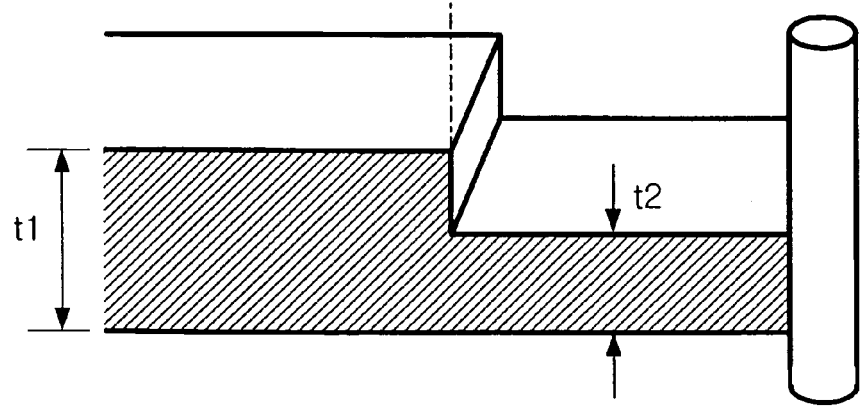
FIG. 2B is a side view illustrating the workpiece of FIG. 2A.
Figure 3A:
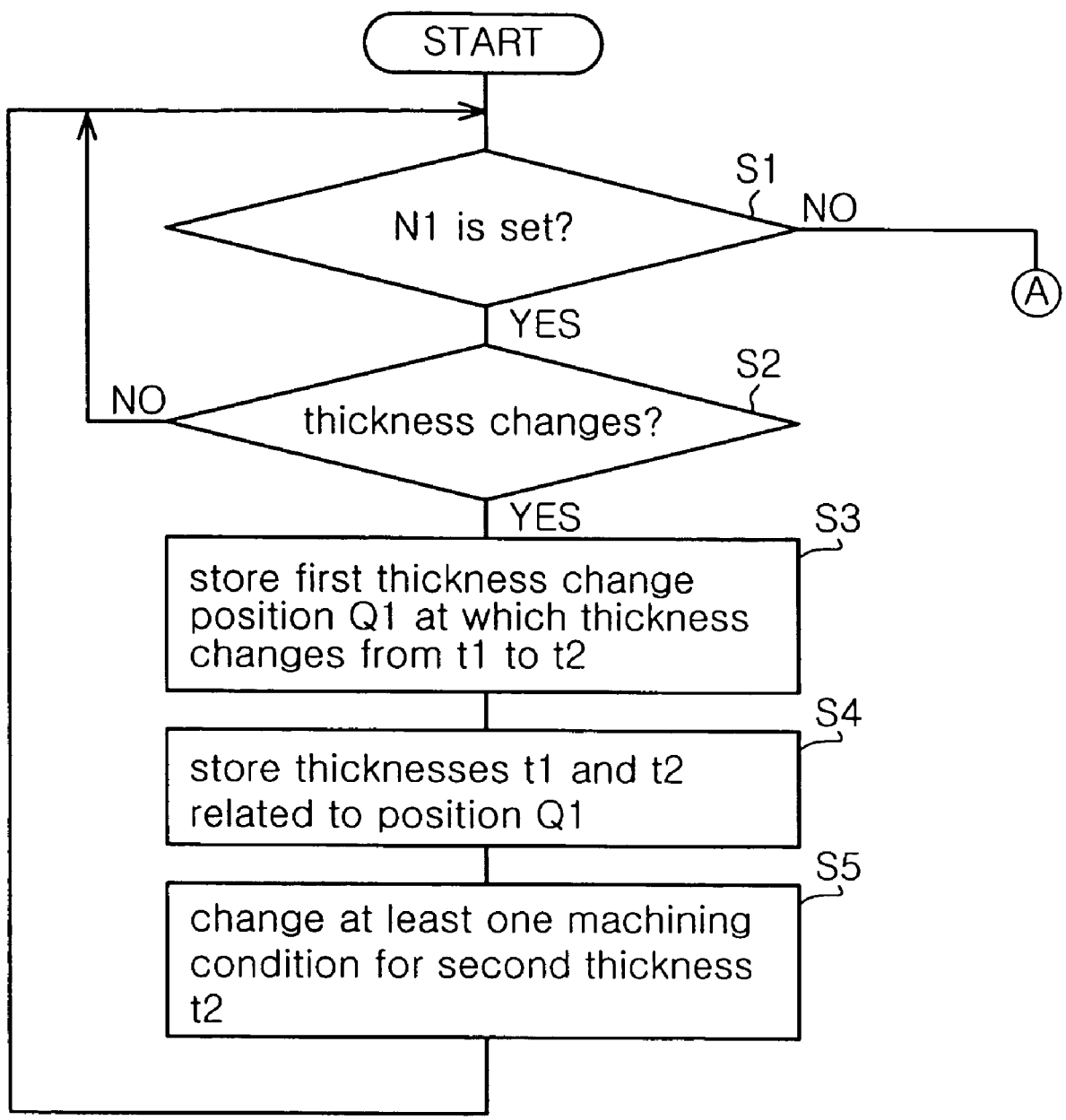
FIG. 3 is a flow chart illustrating a wire electric discharge machining method of the present invention.
Figure 3B:
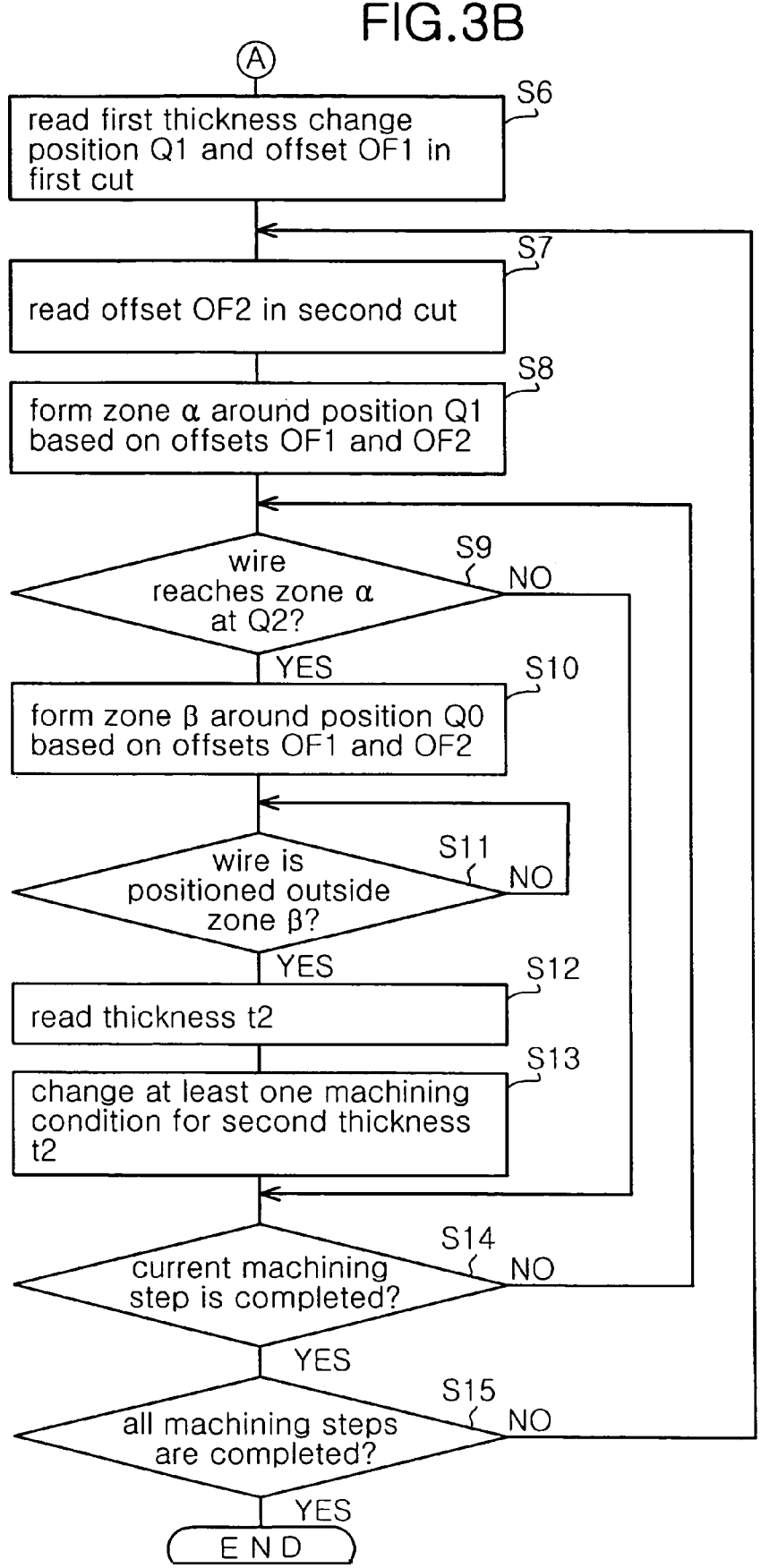

A wire electric discharge machining method of the present invention will now be described with reference to the drawings. The workpiece with different thickness is machined in accordance with a process of FIG. 3.

Figure 4:
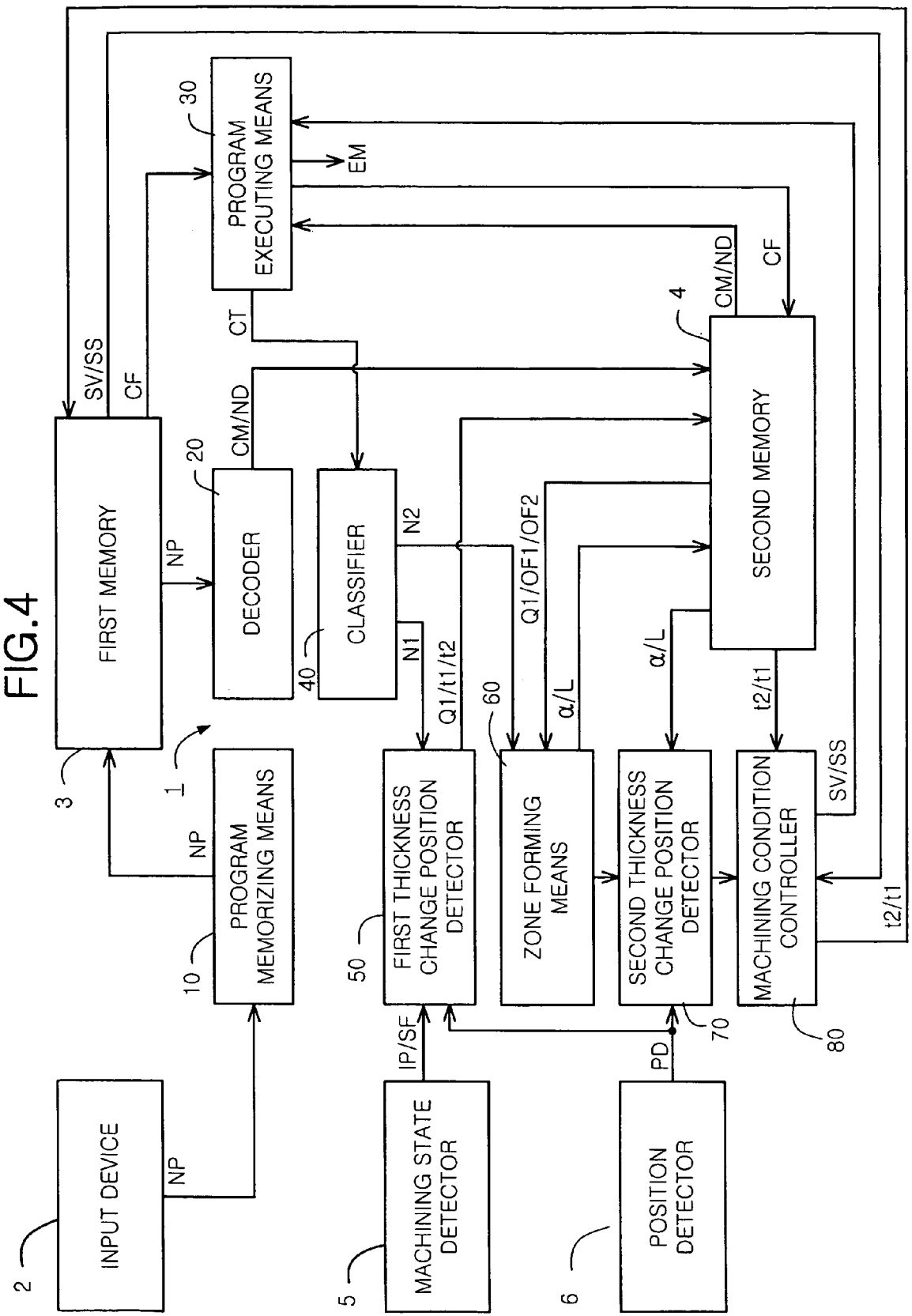
FIG. 4 is a block diagram illustrating an NC device for CNC wire electric discharge machine which is suitable for the wire electric discharge machining method of FIG. 3.
Figures 5, 6:
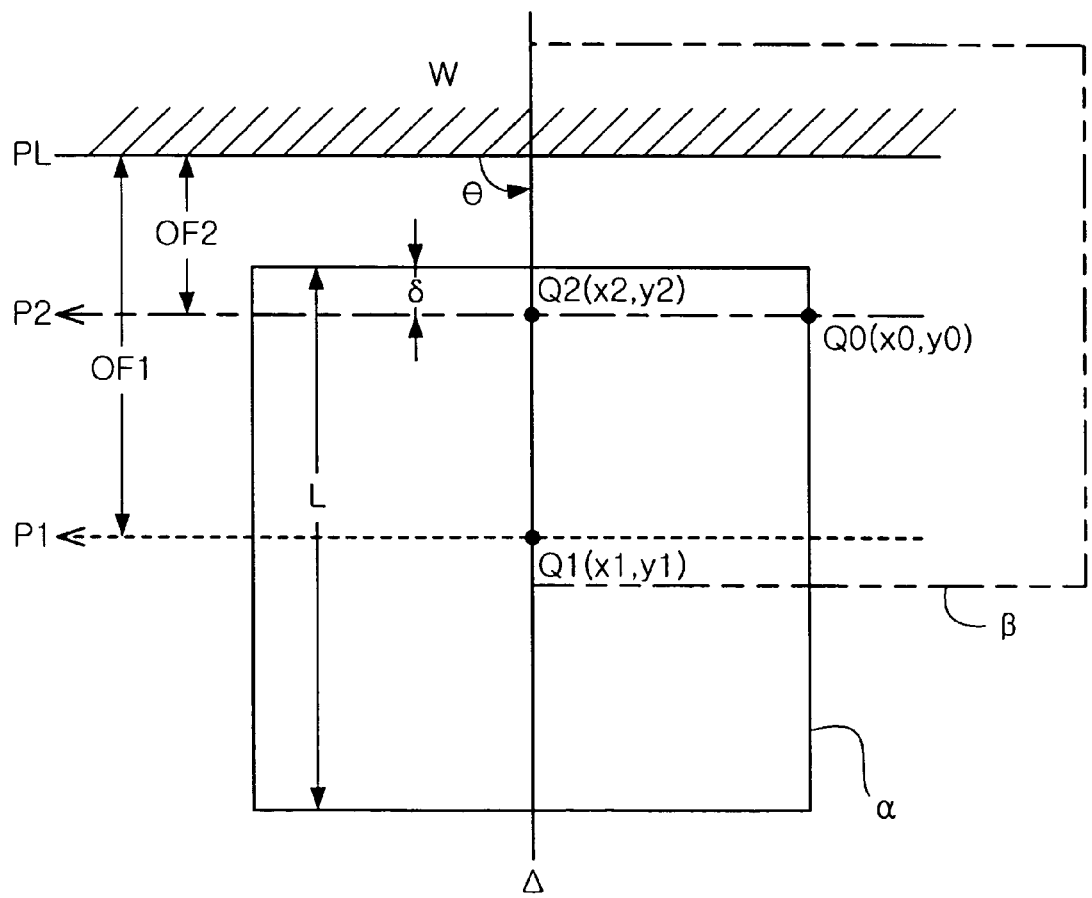
FIG. 5 is an example of a table in which first and second thicknesses are related to thickness change position in first cut.
FIG. 6 is a plain view illustrating a zone formed around the thickness change position.

The method of the present invention is performed by an NC device of FIG. 4. The NC device comprises a processor 1, an input device 2, a first memory 3, a second memory 4, a machining state detector 5 and a position detector 6. The input device 2 has a disc drive, a network adapter and a keyboard. The first memory 3 comprises a hard disc drive or flash memory and stores condition files CF. The condition file CF includes a table of machining conditions and a condition file number is assigned to each condition file CF. The machining condition is, for example, an ON-time, OFF-time and current peak of power pulse, an offset, a servo reference voltage and a feed rate. The offset is defined as a distance from the required shape to the wire path. For example, an offset OF1 in first cut is shown in FIG. 6 as a distance from the required shape PL to a first wire path P1. The offset is set in consideration of a radius of wire electrode and removal material. The processor 1 includes a program memorizing means 10, a decoder 20, a program executing means 30, a classifier 40, a first thickness change position detector 50, a zone forming means 60, a second thickness change position detector 70 and, a machining condition controller 80. The machining state detector 5 detects a machining state feedback such as a mean of current flowing through the work gap and feed rate. The mean gap current feedback IP and feed rate feedback SF are supplied to the first thickness change position detector 50. The position detector 6 comprises a linear scale and a counter, and detects a current wire position PD. The current wire position PD is supplied to the first and second thickness change position detector 50 and 70. The zone forming means 60 is provided for forming a zone α which a wire electrode E can cut across in second cut, as illustrated in FIG. 6. The second thickness change position detector 70 instructs the machining condition controller 80 to change at least one machining condition during times when it is determined that the wire electrode is positioned in the zone α.

An NC program NP for machining the workpiece W with different thickness into a required shape is read by the input device 2. The program memorizing means 10 causes the first memory 3 to store the NC program NP. The NC program NP includes a condition file number for each machining step. The NC program NP further includes an additional NC code such as "FT1080" or "FT2040" for each machining step. The "FT1080" means that machining conditions in a first machining step, i.e., first cut is initially intended to an 80 millimeter-thick workpiece. The "FT2040" means that machining conditions in a second machining step is initially intended to an 40 millimeter-thick workpiece. The decoder 20 fetches and decodes the NC program NP in programmed order to obtain commands CM and the machining conditions ND. The commands CM and machining conditions ND are stored in the second memory 4. The program executing means 30 reads and processes the commands CM and machining conditions ND to supply control signals EM to a power supply, a dielectric fluid supply and motor controllers. The program executing means 30 reads a condition file CF in the first memory 3 in accordance with a condition file number. A number of condition files CF are stored in the second memory 4. The classifier 40 receives data CT representative of current machining step from the program executing means 30 and classifies a current machining step into first cut and second cut. If the current machining step is classified into first cut, the classifier 40 sets N1. Otherwise, the classifier 40 sets N2. At step S1, if N1 is set, the first thickness change position detector 50 detects change in thickness of the workpiece based on changes in a mean gap current feedback IP or feed rate feedback SF during first cut. At step S2, if the first thickness change position detector 50 detects change in thickness of the workpiece W from t1 to t2 at a thickness change position Q1, it causes the second memory 4 to store the thickness change position Q1 at step S3. Further, the first and second thicknesses t1 and t2 are stored in the second memory 4 at step S4. As illustrated in FIG. 5, a serial number is assigned to the thickness change position Q1, and the thicknesses t1 and t2 are related to the thickness change position Q1 in the second memory 4. FIG. 5 shows five changes in thickness as an example. At step S5, at least one machining condition such as an ON-time, OFF-time and current peak of power pulse is changed so as to be suitable for the second thickness t2.

When first cut is completed and second cut is started, N2 is set at the step S1. Then, process proceeds to step S6 where the zone forming means 60 reads an offset OF1 and thickness change position Q1 in first cut from the second memory 4. The zone forming means 60 further reads an offset OF2 in current second cut from the second memory 4, at step S7. At step S8, the zone forming means 60 forms a square-shaped zone α around the position Q1, as illustrated in FIG. 6. The side length L of the zone α is based on a difference between the first and second offsets OF1 and OF2 so that a second wire path P2 can cross the zone α in second cut. The side length L of the square-shaped zone α is calculated by the following equation:

$$L = 2(OF1 - OF2 + \delta)/\sin\theta$$

The δ is a margin for error between a programmed wire path and an actual wire path, and a few μm to about a dozen μm. The θ is a degree of the angle formed by the intersection of the required shape PL with a line Δ. The line Δ is an extension of a line on which thickness of the workpiece W changes. The zone α and the side length L are related to the position Q1 and stored in the second memory 4. The second thickness change position detector 70 reads the zone α and the side length L and compares the current wire position PD to the zone α. When the second thickness change position detector 70 determines that a wire electrode E reaches the zone α at a crossing position Q0, at step S9, it forms an additional square-shaped zone β around the crossing position Q0, at step S10. The square-shaped zone β has the side length L. The second thickness change position detector 70 compares a current wire position the additional zone β. When it is determined that a wire electrode E is positioned at a position Q2 outside the additional zone β at step S11, the second thickness change position detector 70 instructs the machining condition controller 80 to change at least one machining condition at the position Q2 in the zone α. At step S12, the machining condition controller 80 reads the thickness t2 related to the position Q1 in order of serial number. In case that a wire electrode E is being moved in an opposite direction of the first wire path P1, the machining condition controller 80 reads the thickness t1 related to the position Q1 in reverse order of serial number. The machining condition controller 80 reads a servo reference voltage SV and a feed rate SS from the second memory 3 in accordance with the thickness t2 and current machining step. FIG. 7 illustrates an exemplary table in the first memory 3 showing relationship between thickness and machining conditions. The servo reference voltage SV and feed rate SS are supplied to the program executing means 30. At step S13, at least one machining condition is changed so as to be suitable for the second thickness t2. At step S14, if current machining step is completed, process proceeds to step S15. Otherwise, process goes back to the step S9. At step S15, if all machining steps are completed, process ends. Otherwise, process goes back to the step S7 where the zone forming means 60 reads a next offset in third machining step.

The present invention is not intended to be limited to the disclosed form. It is clear that many improvements and variations are possible with reference to the above description. For example, though machining condition is changed at the position Q2 during second cut, it could be gradually changed from the position Q0 to the position Q2. The illustrated embodiment was selected to explain the essence and practical application of the invention. The scope of the invention is defined by the attached claims.

The invention claimed is:

1. A wire electric discharge machining method of machining a workpiece into a required shape with a first cut and a second cut, each cut corresponding with different machining conditions and a wire path on which a wire electrode is moved relative to the workpiece being set for the cut, the method comprising the steps of:
    (a) detecting a position of the wire electrode relative to the workpiece;
    (b) detecting a change in thickness of the workpiece during the first cut;
    (c) storing the position of the wire electrode as a thickness change position when change in thickness of the workpiece from a first thickness to a second thickness is detected;
    (d) forming a zone around the thickness change position;
    (e) comparing the position of the wire electrode to the zone during the second cut; and
    (f) changing at least one machining condition during times when it is determined that the wire electrode is positioned in the zone.

2. The wire electric discharge machining method of claim 1, wherein a side length of the zone is based on a difference between a first offset for the first cut and a second offset for the second cut.

3. The wire electric discharge machining method of claim 1, further comprising the step of:
    storing the first and second thicknesses related to the thickness change position.

4. The wire electric discharge machining method of claim 1, further comprising the step of:
    forming an additional zone around a crossing position at which the wire electrode reaches the zone,
    wherein the step (f) comprises changing at least one machining condition when it is determined that the wire electrode is positioned outside the additional zone.

* * * * *